US006276052B1

(12) United States Patent

Avenoso et al.

(10) Patent No.: US 6,276,052 B1
(45) Date of Patent: Aug. 21, 2001

(54) APPLICATOR SEATING SENSOR

(75) Inventors: John Avenoso, Hershey; Michael Stephen Shank, Camp Hill; Kerry Joseph Stakem, Hummelstown; Robert Allen Dubler, Harrisburg; John David Dodds, Hummelstown, all of PA (US)

(73) Assignee: The Whitaker Corporation, Wilmington, DE (US)

(*) Notice: Subject to any disclaimer, the term of this patent is extended or adjusted under 35 U.S.C. 154(b) by 0 days.

(21) Appl. No.: 09/383,899

(22) Filed: Aug. 26, 1999

(51) Int. Cl.[7] .......................... B23P 19/00; H01R 43/042

(52) U.S. Cl. .......................... 29/751; 29/861; 29/863; 29/857; 29/753; 72/405.01; 72/712

(58) Field of Search .......................... 29/751, 753, 861, 29/862, 863, 882; 72/405.01, 712

(56) References Cited

U.S. PATENT DOCUMENTS

| | | | | |
|---|---|---|---|---|
| 4,020,540 | * | 5/1977 | Casciotti et al. | 29/749 |
| 4,089,405 | * | 5/1978 | Loomis et al. | 198/475 |
| 4,135,378 | * | 1/1979 | Balon | 72/14 |
| 4,462,155 | * | 7/1984 | Brunelle et al. | 29/857 |
| 4,557,048 | | 12/1985 | Cordeiro | 29/863 |
| 4,627,157 | | 12/1986 | Campisi et al. | 29/741 |
| 4,979,291 | | 12/1990 | Phillips et al. | 29/863 |
| 5,101,651 | * | 4/1992 | Yeomans | 72/19 |
| 5,115,735 | * | 5/1992 | Gloe et al. | 100/43 |
| 5,197,186 | * | 3/1993 | Strong et al. | 29/863 |
| 5,271,254 | * | 12/1993 | Gloe et al. | 72/19 |
| 5,341,124 | * | 8/1994 | Layden et al. | 340/568 |
| 5,477,140 | * | 12/1995 | Sato | 324/158.1 |
| 5,560,466 | * | 10/1996 | Folk et al. | 192/130 |
| 5,697,146 | * | 12/1997 | Inoue et al. | 29/753 |
| 5,733,093 | * | 3/1998 | Palm et al. | 414/417 |
| 5,737,829 | | 4/1998 | Wolfe et al. | 29/741 |
| 5,887,340 | * | 3/1999 | Bair | 29/751 |
| 5,930,891 | * | 8/1999 | Loving, Sr. et al. | 29/861 |
| 5,966,806 | * | 10/1999 | Maeda et al. | 29/863 |

* cited by examiner

*Primary Examiner*—Carl J. Arbes
*Assistant Examiner*—Minh Trinh

(57) ABSTRACT

An applicator (10) for crimping a terminal (14) onto a conductor and inserting the crimped terminal into the housing (16) of a partially assembled connector (12) includes a seating sensor for assuring that the terminal is fully inserted into the housing. A backup member (56) which is arranged to engage side edges (184) of the electrical terminal for preventing axial movement additionally makes electrical contact therewith. The pusher member includes a projection (188) that makes electrical contact with the end of the terminal only when the housing and terminal are fully seated. Electrical leads (102, 146) are electrically connected to the backup member and the pusher member so that continuity can be verified after the connector housing is fully seated. In the event that continuity is not detected, an error signal is generated indicating a malfunction.

7 Claims, 5 Drawing Sheets

150
156
132
140
146
144
132
130
122
40
120
158
56
55
53
50
30
10
60
62
64
54
52
146
66
96
68
90
102
148
98
94
104
100

APPLICATOR SEATING SENSOR

The present invention relates to apparatus for crimping a terminal onto a conductor and inserting the crimped terminal into the housing of a partially assembled connector, and more particularly, to such an apparatus having an improve seating sensor for assuring that the terminal is fully inserted into the housing.

BACKGROUND OF THE INVENTION

Apparatus for terminating wires to terminals of partially assembled connectors typically feed a strip of the partially assembled connectors along a guide rail into a workstation where one of the terminals is positioned over an anvil. The wire, its end having been previously stripped of insulation, is positioned in the workstation and the apparatus is activated to cause crimping tools to engage and crimp the tabs of the terminal onto the end of the wire. The crimping tools are then withdrawn and a pusher tool then slides the partially assembled insulated housing over the crimped portion of the terminal to complete the assembly of the connector. Such an apparatus is disclosed in U.S. Pat. No. 4,557,048, which issued Dec. 10, 1985 to Cordeiro. This apparatus performs both the crimping and pushing functions in a single workstation. The wire is securely clamped so that after the terminal is crimped onto the conductor, the upper crimp tooling can be withdrawn and the insulated housing pushed over the terminal. Another example of a similar apparatus is disclosed in U.S. Pat. No. 4,979,291 which issued Dec. 25, 1990 to Phillips et al. This apparatus also performs both the crimping and pushing functions in a single workstation. However, the wire is not gripped by a jaw mechanism, but rather backup fingers are brought into engagement with portions of the crimped tabs to hold the crimped terminal in position while the pusher tool slides the insulated housing over the terminal to complete the assembly. The backup member then pivots out of the way so that the assembled connector can be removed from the apparatus. A problem associated with both of these apparatus is that it is not known whether or not the insulated housing and the crimped terminal are fully seated. The pushers are operated by air cylinders having pistons which sometimes move at different speeds at different times and occasionally stick and then move again, resulting in unreliable and unpredictable operation. This ultimately results in fully assembled terminated connectors, some of which having crimped terminals that are not fully seated in their housings.

What is needed is an apparatus that crimps the wire and terminal, slides the insulated housing over the crimped terminal, and then determines whether or not the crimped terminal is fully seated in the housing, all in a single workstation If the crimped terminal is not fully seated an error signal should be generated to give the operator an opportunity to correct the problem.

SUMMARY OF THE INVENTION

An apparatus is provided for terminating a conductor to an electrical terminal of a partially assembled connector having an insulating housing. The conductor is first crimped to the electrical terminal and then the electrical terminal and the insulated housing are completely assembled. The apparatus including a frame having an anvil supported by the frame and arranged to receive the partially assembled connector. A crimping mechanism is operable in cooperation with the anvil for terminating the conductor to the electrical terminal. A backup member is coupled to the frame and movable between first and second positions. In the first position the backup member is in engagement with a portion of the electrical terminal for preventing axial movement of the electrical terminal in a direction toward the backup member. In the second position the backup member is away from the electrical terminal. A pusher member is coupled to the frame and arranged for engaging and pushing the insulating housing toward the backup member to complete the assembly of the partially assembled connector. Only when the assembly is complete the pusher member makes electrical contact with an end of the electrical terminal opposite the portion in engagement with the backup member. A sensor means is provided for sensing the electrical contact of the pusher member with the end of the electrical terminal. If the electrical contact is not sensed the sensor means will generate an error signal.

An embodiment of the invention will now be described by way of example with reference to the following drawings.

DESCRIPTION OF AN EMBODIMENT OF THE INVENTION

Figure 1:
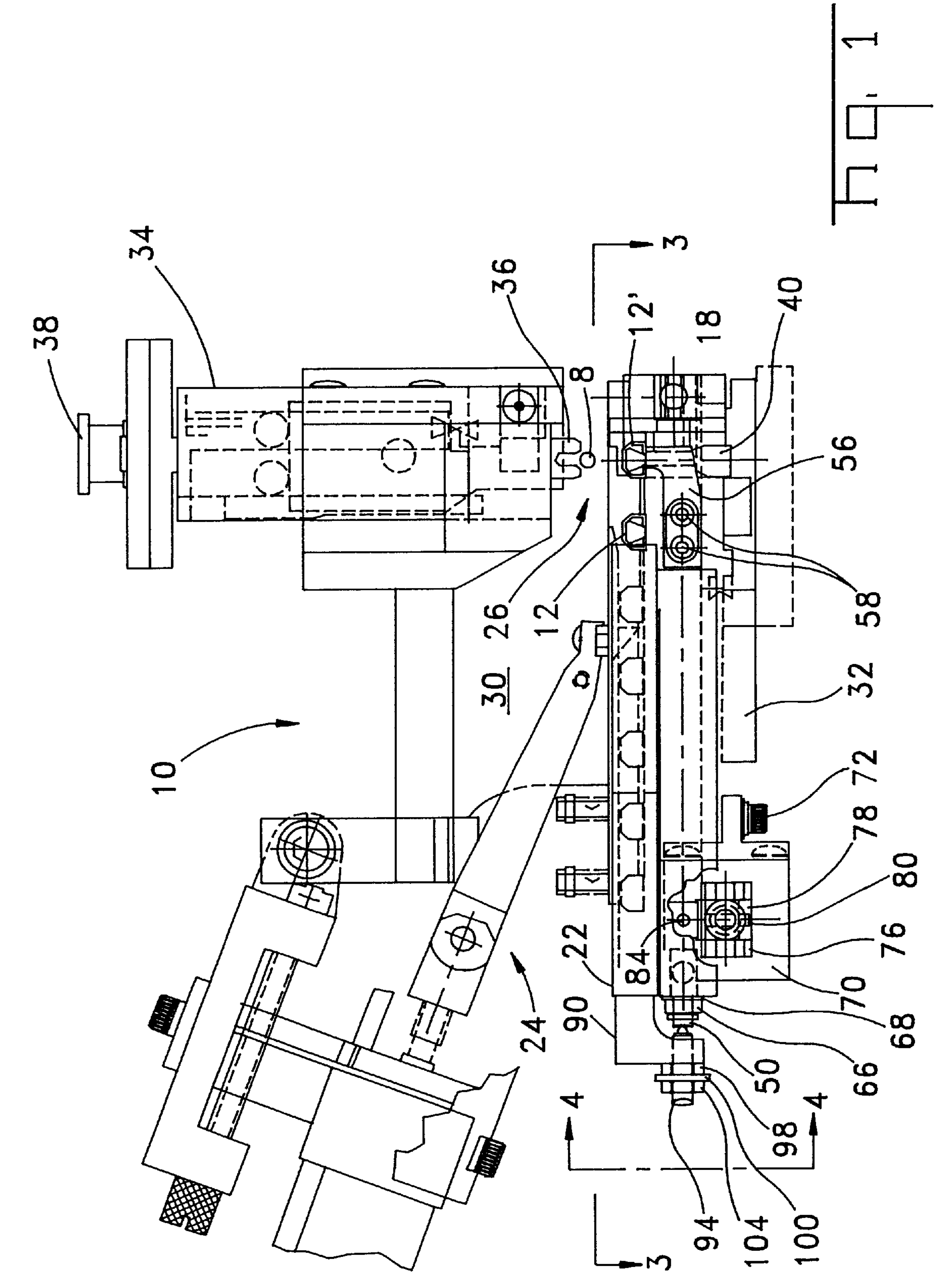
FIG. 1 is a front view of a terminal applicator incorporating the teachings of the present invention.
Figure 2:
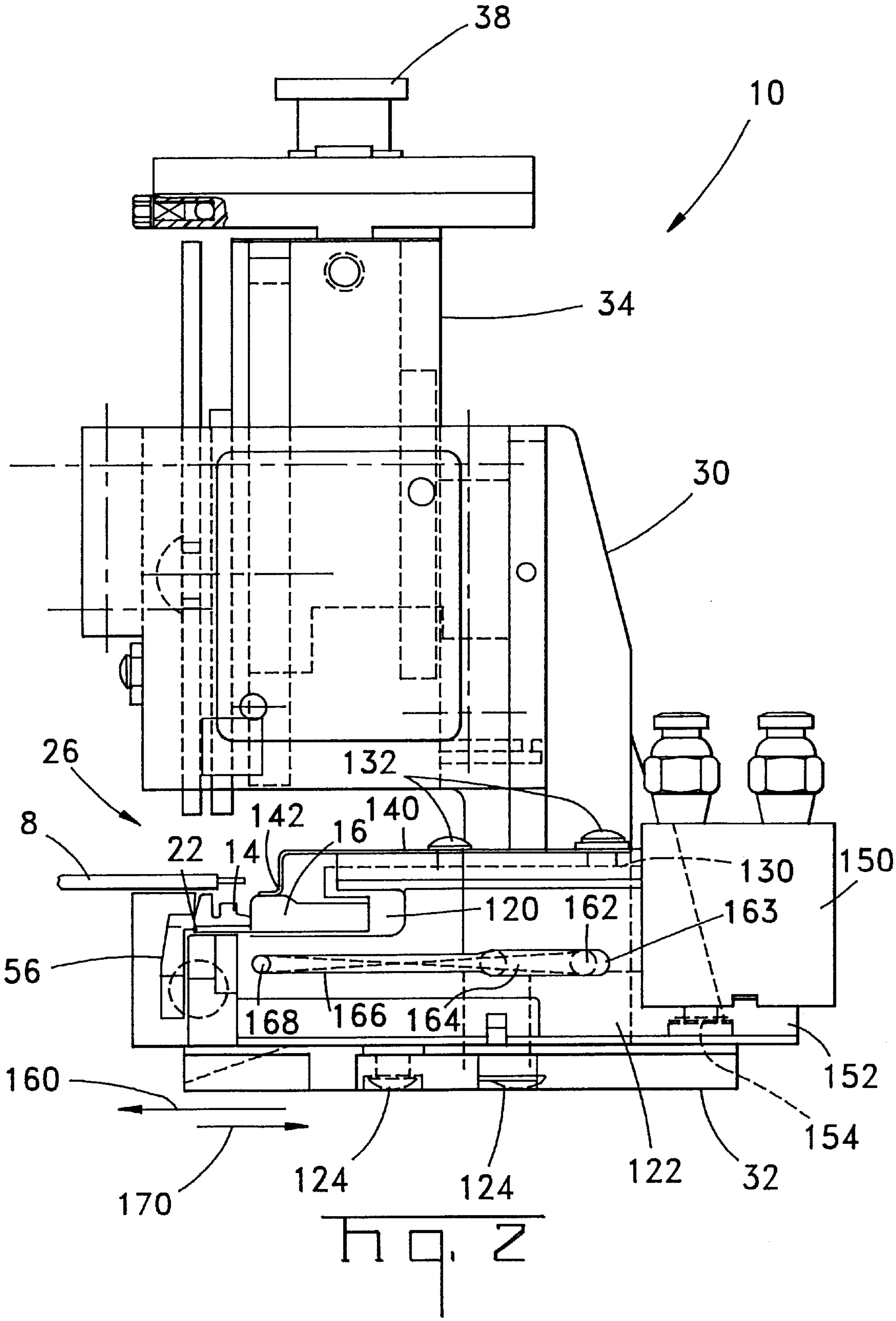
FIG. 2 is a right end view of the applicator shown in FIG. 1.

There is shown in FIGS. 1 and 2 an applicator 10 for terminating a wire 8 to a connector 12. The connector 12 includes an electrical terminal 14 and an attached insulated housing 16. The terminal is partially inserted into the insulated housing, which can be slid completely over the terminal once the terminal is severed from its carrier strip. The terminals 14 are interconnected by a carrier strip 18, in the usual manner, and supplied on a real, not shown. The carrier strip 18 and associated connectors 12 are fed along a guide 22 by means of a feed mechanism 24 to a workstation 26. The applicator 10 includes a frame 30 and a base 32 rigidly attached thereto. The frame 30 supports the feed mechanism 24 and a ram 34 which carries crimping tooling 36 positioned directly above the workstation 26, as seen in FIGS. 1 and 2. The ram 34 includes the usual ram post 38 for coupling to a press ram, not shown, in the usual manner so that the ram 34 can be made to undergo reciprocating motion toward and away from the workstation 26. An anvil 40 is positioned on the base 32 directly under and in alignment with the crimping tooling 36 so that as the tooling reciprocates it moves in and out of crimping engagement with the anvil. The feed mechanism 24 is arranged to move the strip of connectors 12 to the right, as viewed in FIG. 1, to position a single connector 12' in the workstation 26 with its terminal 14 in crimping position on the anvil 40.

Figure 3:
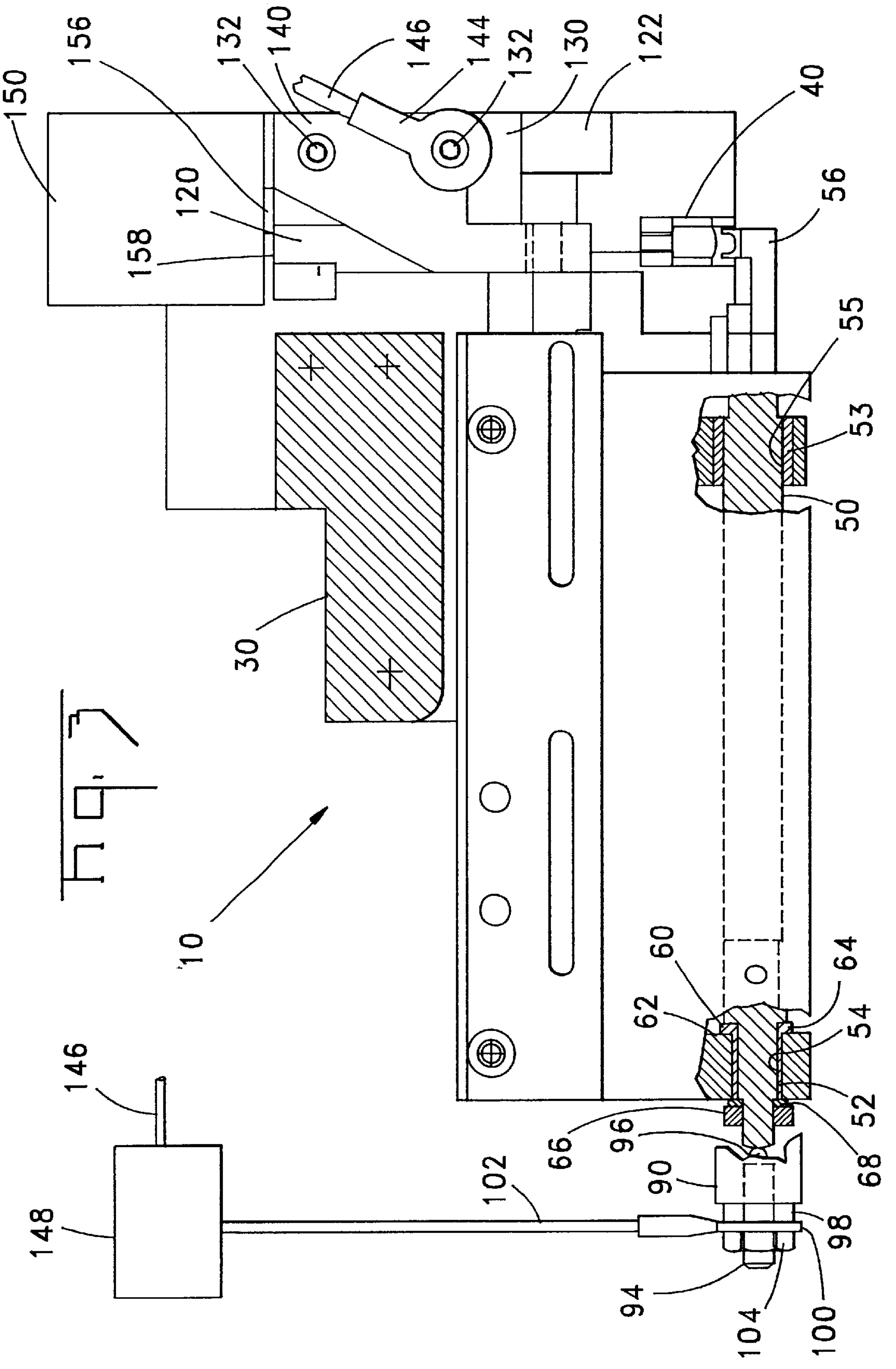
FIG. 3 is a cross-sectional view taken along the lines 3—3 in FIG. 1.
Figure 4:
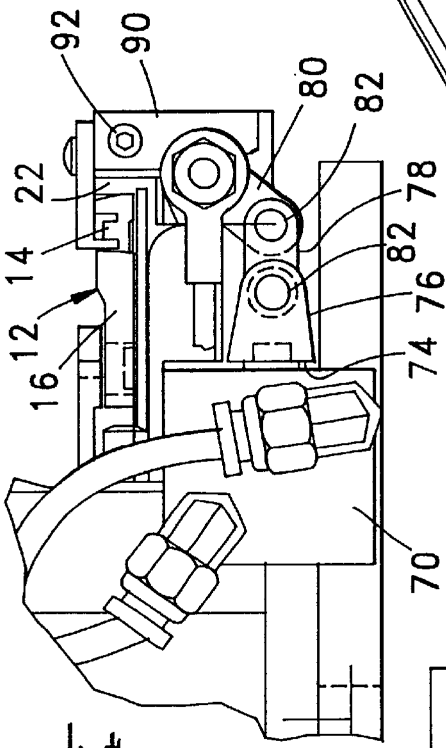
FIG. 4 is a left end view of a portion of the applicator shown in FIG. 1.

A shaft 50 is journaled for pivotal motion in nylon bushings 52 and 53 that are contained within bores 54 and 55 in the frame 30, as best seen in FIGS. 1 and 3. A backup member 56 is attached to the right end, as viewed in FIG. 1, of the shaft 50 by means of screws 58 that extend into threaded holes in the shaft. The bushing 52 includes a flange 60 which is against a shoulder 62 of the frame 30. The left end of the shaft 50 has a reduced diameter that is a slip fit with the bushing 52 and forms a shoulder 64 that resides against the flange 60, as shown in FIG. 3. The end of the shaft 50 includes a lock nut 66 threaded thereon and a nylon washer 68 between the lock nut and the side of the frame 30, thereby limiting end play. The nylon bushings 52 and 53 and the nylon washer 68 effectively electrically isolate the shaft 52 from the frame 30. As best seen in FIGS. 1 and 4, an air cylinder 70 is attached to the frame 30 by means of screws 72, in the usual manner. The air cylinder includes a piston rod 74 having a clevis 76 attached thereto that is interconnected to the shaft 50 through a link 78, pivot pins 82 and a pivot arm 80 that is attached to the shaft by means of a pin 84, as shown in FIG. 1. The air cylinder 70 may be actuated to pivot the shaft 50 so that the backup member 56 is pivoted between a first position shown in solid lines in FIG. 9 and a second position shown in phantom lines in FIG. 9, for a purpose that will be explained. An L-shaped bracket 90 is attached to the left end, as viewed in FIGS. 1 and 3, of the frame 30 by means of a screw 92, shown in FIG. 4, that is threaded into a hole in the frame. The bracket 90 is made of an electrically insulating material and carries a ball plunger 94 that is in a threaded hole in the bracket so that the ball 96 of the ball plunger is in pressing contact with the left end of the shaft 50. A lock nut 98 is threaded onto the outer diameter of the ball plunger 94 and tightened against the bracket 90 to secure the ball plunger in place. An electrical lug 100 having an electrical lead 102 attached thereto is secured to the ball plunger 94 by means of an additional lock nut 104 that is threaded onto the ball plunger, as shown in FIG. 3. There is electrical continuity from the lead 102 through the ball plunger 94, the ball 96, the shaft 50, and the backup member 56 for a purpose that will be explained.

Figure 5:
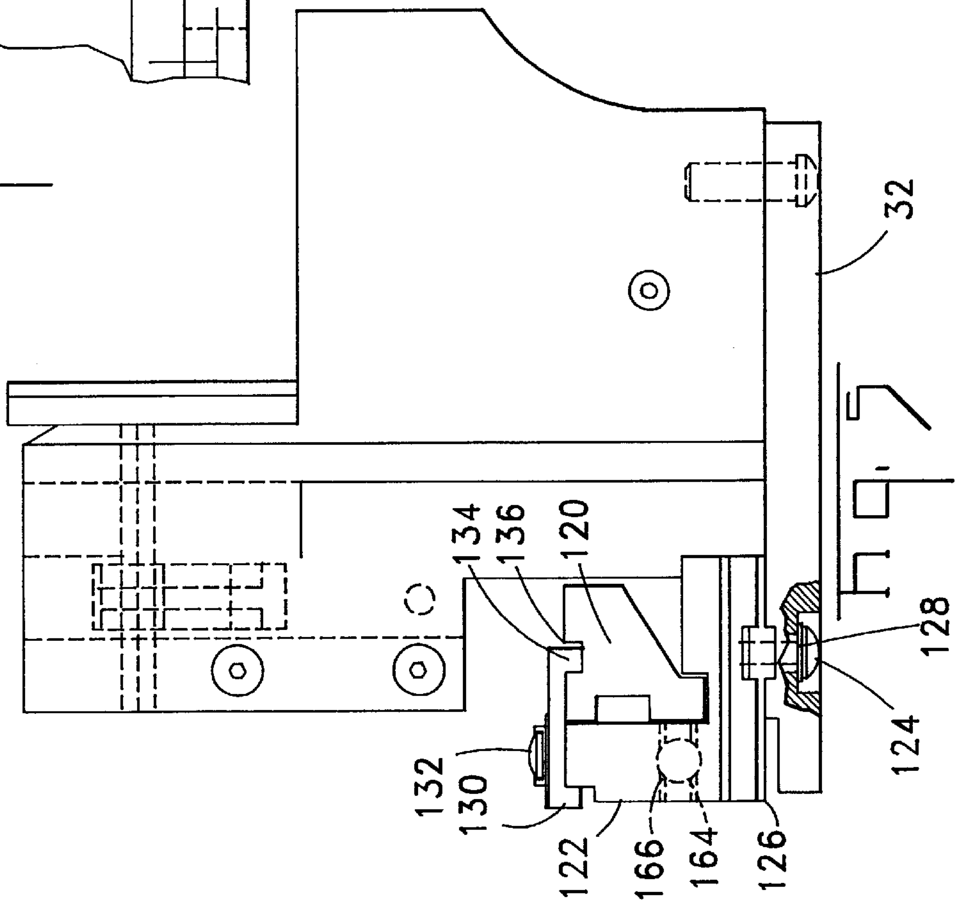
FIG. 5 is rear view of a portion of the applicator shown in FIG. 1 with an air cylinder removed to show the slide mechanism.

As best seen in FIGS. 2, 3, and 5, a pusher member 120 is arranged to slide within a slide holder 122 that is attached to the base 32 by means of screws 124 that extend through counterbored holes in the base and into threaded holes in the slide holder. The slide holder is electrically isolated from the base 32 by an insulating key 126 that locates in slots formed in both the slide holder 122 and the base 32, as best seen in FIG. 5. The screws 124 extend through close fit holes in the key 126 so that they are spaced from the walls of the counterbored holes in the base 32. An insulating washer 128 is provided between the head of each screw 124 and the bottom of the counterbore so that the screws and the slide holder 122 remain electrically isolated from the base 32. A gib plate 130 is attached to the top surface of the slide holder by means of screws 132 that extend through the gib and into threaded holes in the slide holder. The gib plate includes a turned down flange 134 that engages a slot 136 formed in the top surface of the pusher member 120 to guide the pusher member and limit side to side play. A hold down spring 140 is attached to the top surface of the gib plate 130 by the screws 132, as best seen in FIGS. 2 and 3, and includes an end 142 that is bent downwardly so that it is near the upper surface of housing 16 of the connector 12'. This limits upward movement of the strip of connectors during operation. An electrical lug 144 having an electrical lead 146 attached thereto is secured to the hold down spring 140 by one of the screws 132, as best seen in FIG. 3. The electrical lead is thereby electrically connected, through the slide holder 122, to the pusher member 120 which, as set forth above, is electrically isolated from the rest of the applicator 10. Both lead 102 and 146 are connected to a controller 148, as shown in FIG. 3, for a purpose that will be explained. An air cylinder 150 is attached to a flange 152 extending from the slide holder 122 by means of screws 154 extending through counterbored holes in the flange and into threaded holes in the air cylinder, as best seen in FIG. 2. The air cylinder has a piston rod 156 that abuts against an end surface 158 of the pusher member 120, as shown in FIG. 3. When the air cylinder 150 is pressurized the piston rod 156 extends causing the pusher member 120 to move toward the anvil 40 in the direction of the arrow 160 of FIG. 2. A pin 162, as shown in FIG. 2, extends outwardly from the pusher member through an elongated hole 163 formed in the side of the slide holder 122. A compression spring 164 contained in a hole 166 formed in the slide holder 122 so that it breaks out into the end of the elongated hole 163. A spring pin 168 in a transverse hole intersects the hole 166 and serves to retain the left end of the compression spring 164 within the hole 166 while the right end of the spring is against the pin 162. When the air cylinder 150 is pressurized and the pusher member 120 moves toward the anvil 40 the pin 162 also moves in the direction of the arrow 160 compressing the spring 164. When the pressure in the air cylinder is vented the compression spring 164 urges the pin 162 toward the right, as viewed in FIG. 2, thereby returning the pusher member 120 in the direction of the arrow 170 to its starting position as shown.

Figure 6:
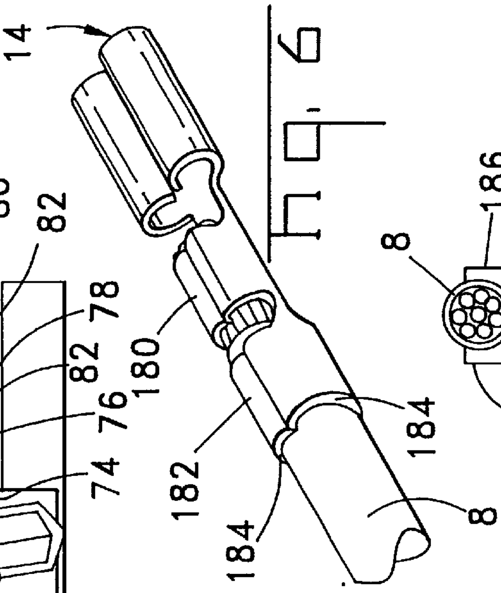
FIG. 6 is an isometric view of a wire having an electrical terminal crimped thereto.
Figure 7:
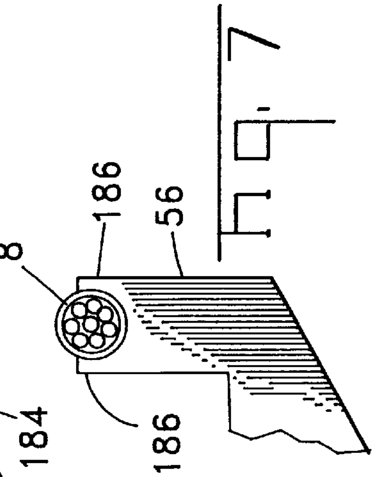
FIG. 7 is a front view of a portion of the wire stop shown in FIG. 1.
Figure 8:
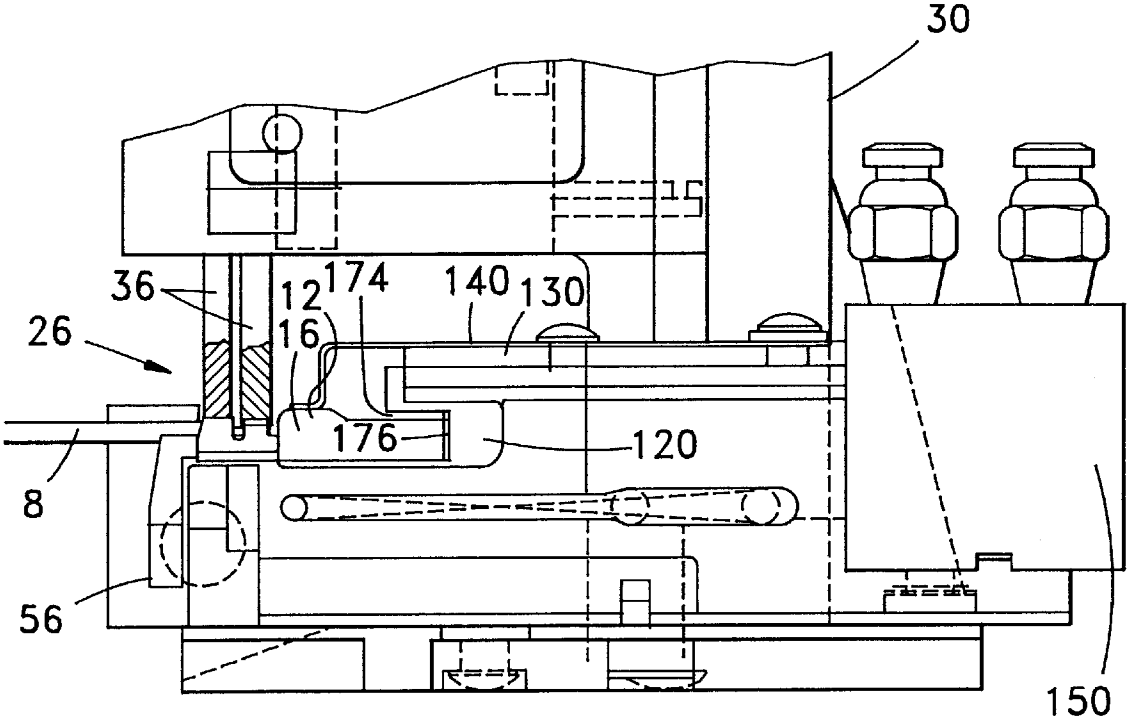
FIG. 8 is a right end view of a portion of the applicator shown in FIG. 1 having a partial cutaway of the crimping tooling.
Figure 9:
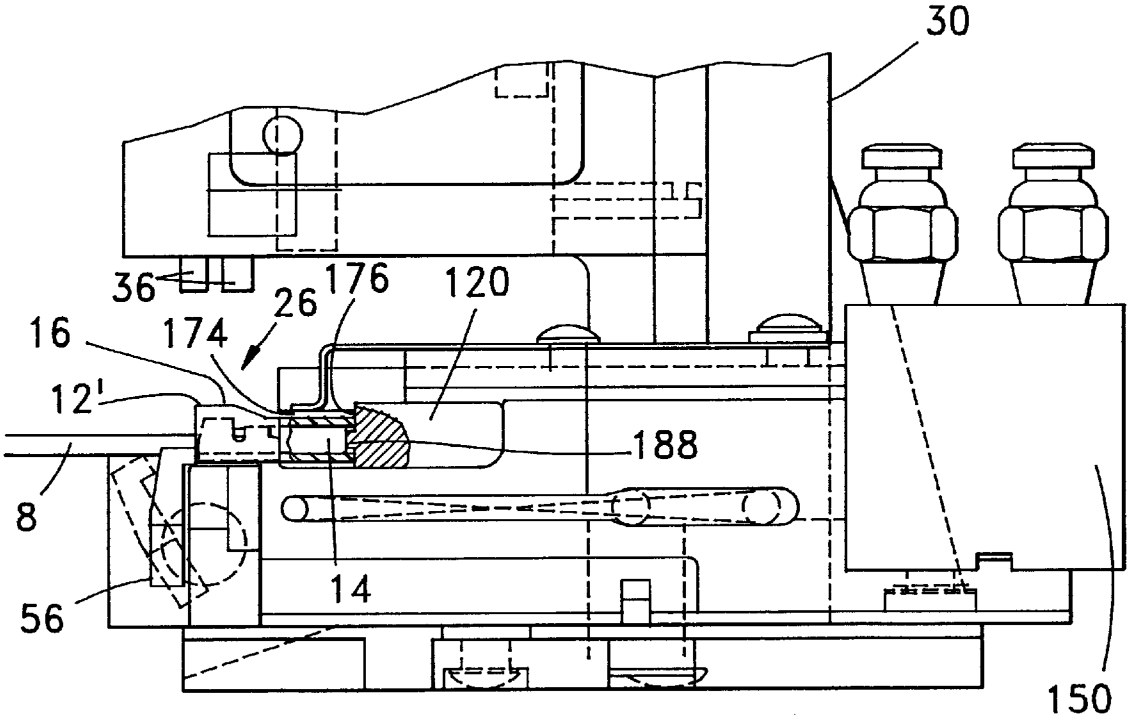
FIG. 9 is a view similar to that of FIG. 8 having a partial cutaway of the pusher and connector housing.

As shown in FIG. 9, the pusher member 120 includes a cutout 174 having a bottoming surface 176 that is in close proximity to an end of the insulated housing 16. During operation, as the strip of connectors 12 is being fed along the guide 22, a connector 12' enters the workstation 26 so that its terminal 14 is positioned over the anvil 40 and its housing 16 is positioned within the cutout 174. The stripped end of a wire 8 is positioned in the work station 26 in alignment with the terminal 14 and the applicator is operated to cause the crimping tooling 36 to move toward the anvil 40 and engage and crimp the terminal 14 to the wire 8, as shown in FIG. 8. The terminal 14 includes barrel tabs 180 that are crimped to the conductor of the wire and insulation tabs 182 that are crimped to the insulation of the wire, in the usual manner, as shown in FIG. 6. After the insulation tabs 182 are crimped, side edges 184 are formed that bulge laterally outwardly from the outside diameter of the wire. As can be seen in FIG. 7, the backup member 56 includes a pair of fingers 186 that straddle the wire 8 and engage the side edges 184 when the backup member is in its first position shown in FIG. 8. After the crimping tooling 36 is retracted, as shown in FIG. 9, the cylinder 150 is pressurized to move the pusher member 120 toward the anvil thereby engaging and moving the insulated housing 16 toward the left so that it slides over the crimped portion of the terminal 14. During this movement the fingers 186 of the backup member 56 prevent movement of the terminal 14 in the direction of the arrow 160. The pusher member 120 includes a projection 188 that extends from the bottoming surface 176 into the opening of the insulating housing 16. When the pusher member 120 has fully seated the housing 16 to the terminal 14, the projection 188 will electrically contact the end of the terminal 14, as shown in FIG. 9. This completes a circuit between the two electrical leads 102 and 146. This completed circuit includes the electrical lug 100, the ball plunger 94 and ball 96, the shaft 50, the backup member 56 and fingers 186, the terminal 14, the pusher member 120 and projection 188, the slide holder 122, the screw 132 and electrical lug 144. The controller 148 attempts to detect continuity between the leads after the pusher member 120 has had sufficient time to reach the position shown in FIG. 9 where the housing 16 is fully seated but before the pusher member is withdrawn. The cylinder 150 is then vented so that the compression spring 164 causes the pusher member 120 to withdraw to its position shown in FIG. 8, and the cylinder 70 is actuated to pivot the shaft 50 so that the backup member 56 pivots away from the terminated connector 12' to its second position shown in phantom lines in FIG. 9 so that the terminated wire 8 can be removed and the cycle repeated.

In the event that continuity between the leads 102 and 146 is not detected, an error signal is generated by the controller 148 which warns the operator that the housing has not been properly assembled to the terminal. In the present example, the applicator 10 is coupled to a host machine, not shown, that automatically makes electrical leads. The error signal causes the host machine to pause thereby permitting the operator to investigate the cause of the error signal. In this example, the controller of the host machine, rather than the separate controller 148, is used to detect continuity between the two leads 102 and 146 within a desired time interval, and to generate the error signal when required. However, any suitable controller that is commercially available may be used to perform these functions, as a stand alone applicator or in combination with a host machine as in the present example.

An important advantage of the present invention is that a completed connector 12 having a housing that is not fully seated can be easily detected and brought to the attention of the operator. Another important advantage is that the present apparatus is easily coupled to a host automated lead making machine that uses the applicator to terminate the connectors to leads being manufactured. Additionally, the terminal crimping operation, the final assembly of the housing to the terminal, and the testing for continuity is all performed in a single workstation thereby providing a more efficient and reliable operation.

What is claimed is:

1. An apparatus for terminating a conductor to an electrical terminal of a partially assembled connector having an insulating housing, wherein said conductor is first crimped to said electrical terminal and then said electrical terminal and said insulated housing are completely assembled, said apparatus including:

(1) a frame;

(2) an anvil supported by said frame and arranged to receive a said partially assembled connector;

(3) a crimping mechanism operable in cooperation with said anvil for terminating a said conductor to said electrical terminal;

(4) a backup member coupled to said frame and movable between a first position in engagement with a portion of said electrical terminal for preventing axial movement of said electrical terminal in a direction toward said backup member, and a second position away from said electrical terminal;

(5) a pusher member coupled to said frame and arranged for engaging and pushing said insulating housing toward said backup member to complete said assembly of said partially assembled connector, and only when said assembly is complete making electrical contact with an end of said electrical terminal opposite said portion; and (6) sensor means for sensing said electrical contact of said pusher member, the absence of said sensing said electrical contact causing said sensor means to generate an error signal.

2. The apparatus according to claim 1 wherein said backup member is electrically conductive, and when in said first position is in electrical contact with said electrical terminal.

3. The apparatus according to claim 2 wherein said pusher member includes a projection for making said electrical contact with said end of said electrical terminal and wherein said sensor means is arranged for sensing electrical continuity between said backup member and said projection.

4. The apparatus according to claim 3 wherein said sensor means is a programmable controller having a first circuit electrically connected to said backup member and a second circuit electrically connected to said projection.

5. The apparatus according to claim 4 wherein said first circuit includes a wiper contact coupled to but electrically insulated from said frame, in electrical contact with said backup member.

6. The apparatus according to claim 5 wherein said backup member is attached to an carried by a shaft that is pivotally coupled to said frame for pivotal movement in one direction for moving said backup member into said first position and in another direction for moving said backup member into said second position, said wiper contact in electrical engagement with an end of said shaft.

7. The apparatus according to claim 6 wherein said wiper contact is a ball plunger having an axis of movement coincident with a longitudinal axis of said shaft.

* * * * *